Nov. 24, 1959    A. F. UNDERWOOD    2,914,367
SLEEVE BEARING
Filed Jan. 17, 1955

INVENTOR
Arthur F. Underwood
BY
J. E. Ross
ATTORNEY

United States Patent Office 2,914,367
Patented Nov. 24, 1959

2,914,367

SLEEVE BEARING

Arthur F. Underwood, Rochester, Mich., assignor to General Motors Corporation, Detroit, Mich., a corporation of Delaware Application January 17, 1955, Serial No. 482,066

2 Claims. (Cl. 308—237)

This invention relates to bearings and to a method of making bearings.

One object of the invention is to provide a bearing having improved fatigue life. Another object is to provide a new method for making the bearing. Other objects and advantages of the invention will become more apparent from the following description.

A conventional plain bearing has a substantially uniform thickness at all points on any cross-section taken longitudinally or lengthwise of the bearing and journal. In accordance with the present invention the bearing surface is concaved as viewed in longitudinal cross-section. This construction has the effect of decreasing the oil film leakage from the edges or ends of the bearing. As a result the oil film pressure is maintained at a higher value closer to the edges of the bearing. This reduces the maximum oil film pressure at the center of the bearing, thereby reducing the fatigue of the bearing metal.

Reference is herewith made to the accompanying drawing illustrating a construction in accordance with one embodiment of the invention.

Figure 1:
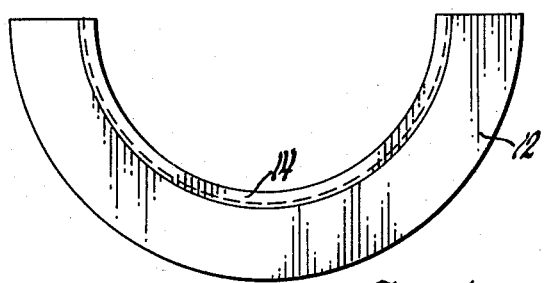
Figure 1 is an elevational end view of a flanged half bearing.
Figure 2:
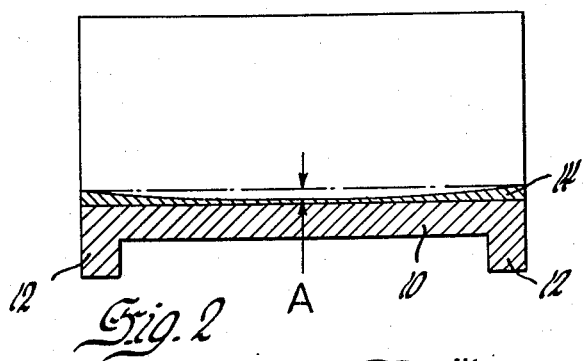
Figure 2 is a cross-sectional view taken on line 2—2 in Figure 1.

In the drawing 10 represents a supporting shell of relatively hard and strong metal having flanges 12, 12 at the ends thereof. Lining the shell and strongly bonded thereto is a layer of relatively soft bearing metal 14 or alloy of any desired composition. As indicated, especially in Figure 2 on an exaggerated scale, the bearing surface of the softer bearing metal is concaved on a longitudinal axis by an amount indicated by A. The value of A may vary between about .0002" and .005" depending on the bearing design and operating conditions. The lower value is preferred for a small, highly loaded bearing such as is typified by an automotive connecting rod. For larger bearings with lower loading (high $ZN/p$ values) the concavity may be increased up to as high as about .005". In the expression "$ZN/p$," "$Z$" represents the viscosity of the oil in the bearing, "$N$" the number of revolutions per minute, and "$p$" the bearing pressure in pounds per square inch. The preferred concavity is one having a hyperbolic form.

Figure 3:
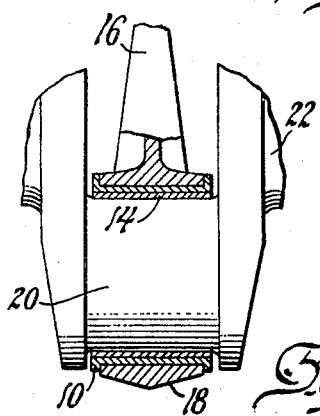
Figure 3 is a fragmentary elevational view with parts in section of a shaft and journal bearing assembly.
Figure 4:
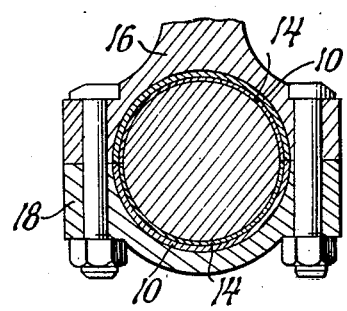
Figure 4 is a transverse sectional view of the assembly shown in Figure 3.

A conventional shaft and journal bearing assembly is shown in Figures 3 and 4 in which the semi-cylindrical shell members 10 of the flanged half bearings are assembled between the connecting rod 16 and cap 18 with the bearing material 14 on said shell members providing the bearing surface for the journal portion 20 of the shaft 22.

The concaved bearing surface may be formed in any desired manner. However, a preferred method in accordance with the invention comprises supporting a bearing of substantially equal cross-sectional dimensions throughout its length in a nest having a raised center which deflects the bearing shell the amount necessary to produce the desired concavity and then broaching the bearing with a standard broach having circular cutting edges. After broaching and removal from the nest, the bearing returns to its normal shape with the desired concavity formed therein.

Numerous changes and modifications of the embodiment of my invention described herein may be made by those skilled in the art without departing from the spirit and principles of the invention.

I claim:

1. A shaft and journal bearing assembly comprising in combination a shaft having journal portions thereon, semi-cylindrical shell members adapted to cooperate with said shaft journal portions, a layer of bearing material bonded to the inner periphery of said shell members, and a longitudinally extending concave bearing surface formed in said bearing material circumferentially around said inner periphery, said concave surface providing a maximum of shaft clearance at the longitudinal center of said shell members and a minimum clearance at the respective longitudinal ends of said shell members so that the pressure of the lubricating oil is evenly distributed between said shaft journal and said concave bearing surface of said semi-cylindrical shell members.

2. In combination a shaft and journal bearing comprising a shaft having journal portions thereon, semi-cylindrical bearing shell members adapted to cooperate with said shaft journal portions, a layer of bearing material bonded to the inner periphery of said shell members, and a longitudinally extending concave bearing surface formed in said bearing material circumferentially around said periphery thereof, said concave surface providing a maximum of shaft clearance between .0002" and .005" at the longitudinal center of said shell members and a minimum of shaft clearance at the respective longitudinal ends of said shell members so that the lubrication oil pressure is evenly distributed between said shaft journal and said concave bearing surface of said semi-cylindrical shell members to provide longer bearing life.

References Cited in the file of this patent

UNITED STATES PATENTS

| | | |
|---|---|---|
| 2,210,132 | Searles | Aug. 6, 1940 |
| 2,679,438 | Love | Mar. 25, 1954 |
| 2,796,659 | Buske | June 25, 1957 |

FOREIGN PATENTS

| | | |
|---|---|---|
| 499,928 | Great Britain | Jan. 31, 1939 |
| 526,356 | Great Britain | Sept. 17, 1940 |
| 1,079,848 | France | May 26, 1954 |
| 715,562 | Great Britain | Sept. 15, 1954 |